United States Patent [19]

Taylor

[11] 4,097,849

[45] Jun. 27, 1978

[54] ELECTRONIC COMPARATOR FOR PROCESS CONTROL

[75] Inventor: Francis M. Taylor, Xenia, Ohio

[73] Assignee: Systems Research Laboratories, Inc., Dayton, Ohio

[21] Appl. No.: 726,990

[22] Filed: Sep. 27, 1976

[51] Int. Cl.² ............................................. G01B 11/06
[52] U.S. Cl. ................................ 340/213 Q; 356/159
[58] Field of Search ...................... 340/52 F, 52 R, 53, 340/213 Q, 267 R, 279, 413; 356/159, 199, 200

[56] References Cited

U.S. PATENT DOCUMENTS

| | | | |
|---|---|---|---|
| 3,039,687 | 6/1962 | Chope | 340/213 Q |
| 3,562,708 | 2/1971 | Verbarg et al. | 340/146.1 R |

*Primary Examiner*—Alvin H. Waring

*Attorney, Agent, or Firm*—Biebel, French & Nauman

[57] ABSTRACT

An optical micrometer scans an article passing through its zone of measurement to provide a series of pulses representing the dimension of an article. Each new measurement is compared against a previous measurement, or an average of a predetermined number of previous measurements, and the difference is then compared to a previously established deviation limit. If this difference does not exceed the deviation limit, then the new measurement is transferred to the output of the circuit for utilization by the system, but if this difference exceeds the deviation limit, then the previous measurement signal will be transferred to the output. An alarm is provided whenever a predetermined number of new measurement signals outside the deviation limit occur within a certain number of measurement intervals.

7 Claims, 4 Drawing Figures

ELECTRONIC COMPARATOR FOR PROCESS CONTROL

BACKGROUND OF THE INVENTION

This invention relates to an electronic circuit for receiving periodically generated measurement signals and for providing an output which may be used in a process control.

This invention may be used with an optical micrometer incorporating a laser generated beam to measure the dimension of an elongated cylindrical article, such as steel tubing, or coated wire. An accurate measurement of the dimension of that article can then be used in a closed loop control system to adjust those elements which determine the size of the article to maintain the size at a specified value. By the nature of some manufacturing processes, the amount or rate of change of control is limited by the nature of that process. Occasionally, however, a measuring device, such as the optical micrometer referred to above, might provide an output representing a measurement which is either physically impossible under normal operating conditions or is not controllable. For example, the optical micrometer may erroneously mistake the edge of a stream of water across an observation window for the edge of a coated cable, or an excessive amount of material may accidentally be deposited on or protrude from the article, and in either case, the measurement does not accurately reflect a true change in the dimension of the article, and that measurement should be rejected.

SUMMARY OF THE INVENTION

This invention relates to an electronic circuit in which each new measurement is compared against previous measurements, and those new measurements within the dynamic tracking range of a control system are applied to an output for use by the system while those new measurements outside the dynamic tracking range are rejected and the previous measurement substituted therefor.

While the invention is broadly useful in any control system, it will be described in connection with a system using an optical micrometer to measure the dimension of an article passing through its zone of measurement.

In one embodiment of the invention, each new dimension measurement is subtracted from the previous measurement, and the difference between these two measurements is compared with a previously established deviation limit. If the difference between the new measurement signal and the previous measurement signal does not exceed this deviation limit, then the new measurement signal is transferred to the output of the circuit for utilization by the system; but if the difference exceeds the deviation limit, then the previous measurement signal is applied to the output.

The previous measurement signal may be the last preceding output signal on an average of a predetermined number of preceding output signals. The circuit also includes alarm means for providing an indication whenever a predetermined number (or percentage) of new measurement signals outside the deviation limit occur within a certain number of measurement intervals.

In another embodiment of the invention, the pulses from the optical micrometer representing the dimension of the article are applied to an up-counter, and after the measurement cycle is completed, this number is transferred to a down-counter. The previous measurement signal is applied to a second down-counter, and both of these counters are provided with clock pulses to decrement these counters until one reaches its terminal or zero state. The number remaining in the other counter is then compared to a deviation limit, and if the new measurement is within that limit, the new measurement is transferred to the output; but if the difference exceeds that limit, the previous measurement will be transferred to the output.

Accordingly, it is an object of this invention to provide circuit means especially useful in closed-loop control systems whereby those measurements within the dynamic range of control of the system are utilized by the system while the previous or an average of the previous measurements are utilized whenever the new measurement signal is found to be outside the dynamic range.

Other objects and advantages of the invention will be apparent from the following description, the accompanying drawings and the appended claims.

DESCRIPTION OF THE PREFERRED EMBODIMENTS

Figure 1:
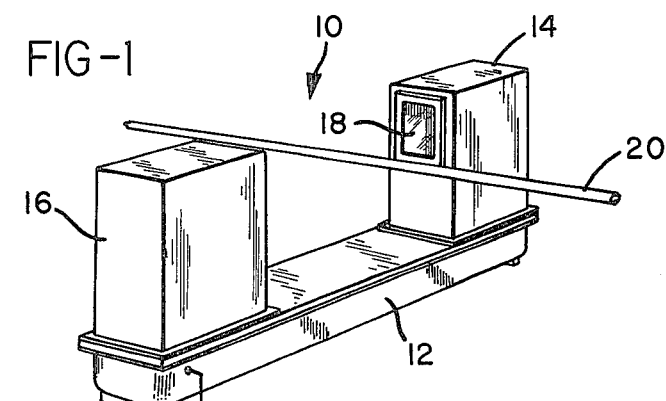
FIG. 1 is a view showing the optical micrometer and a block diagram of the associated electrical circuitry.

Referring now to the drawings which show the preferred embodiments of the invention, and particularly to FIG. 1, an optical micrometer 10 includes a base member 12 containing a light source, such as a laser, and associated electronic circuitry, a first upright end housing 14 containing a beam scanning mechanism, and a second upright end housing 16 containing a photoelectric detector element. Both the housings 14 and 16 include opposing glass windows 18 through which a beam of light is directed to scan the generally cylindrical object 20 which passes through a zone of measurement located generally centrally between the housings and to provide a measure of its diameter or dimension in a plane perpendicular to the direction of scanning.

In the preferred embodiment of the invention, the optical micrometer is similar to that described in U.S. Pat. No. 3,765,774 and provides an output in the form of a series of pulses which is directly related to the diameter of the object located in the zone of measurement. Briefly stated, a beam of light is scanned vertically through the zone of measurement with the object interrupting the beam for a portion of the scanning interval.

Figure 2:
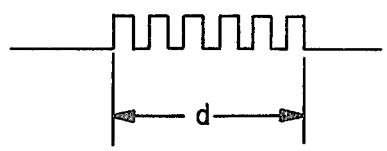
FIG. 2 is a waveform diagram of an optical micrometer output signal.

During that interval in each scanning cycle when the object interrupts the beam, a series of pulses is generated, the number of which is directly related to the size of the object. The optical micrometer also includes a means for generating a signal usually a pulse generated by a beam passing over a separate photodetector, at the beginning of each scan. A pulse generator is also included in the optical micrometer to control the rate of scanning and to provide the reference against which the diameter measurement is made. The number of pulses occurring in the interval "$d$" shown in FIG. 2 is directly related to the diameter or size of the object in the zone of measurement.

Referring again to FIG. 1, each new measurement signal is compared to a previous measurement signal by comparator circuit 30, and if the difference between these signals is less than a predetermined measurement, then the new measurement signal is applied to an averaging circuit 35, the output of which is displayed on the device 40, or recorded, according to the particular use to which the optical micrometer is employed. In the present invention, if a new measurement signal differs from the previous measurement signal by more than the predetermined amount, then the previous measurement signal will be substituted therefor. An alarm circuit 45 is provided to indicate whenever a predetermined number or percentage of bad or erroneous measurement signals are sensed within a given period of time or number of measurement intervals.

Figure 3:
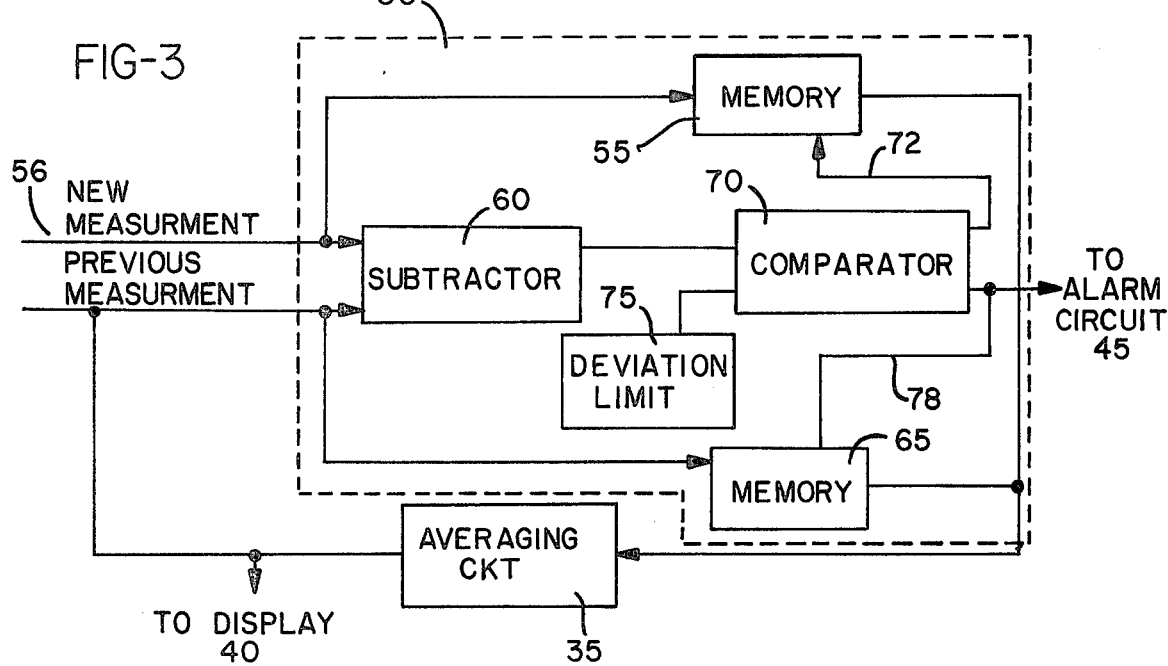
FIG. 3 is a block diagram of a comparator circuit constructed according to this invention.

Referring now to the block diagram shown in FIG. 3, each new measurement signal from an optical micrometer is carried on line 50 to the circuit 30 for processing where it will be compared to a previous measurement, either the last measurement or an average of a predetermined number of previous measurements, and the circuit 30 will then provide an output representing either the new measurement, or if the new measurement differs by more than a predetermined amount from the previous measurements, then the new measurement will be disregarded as unacceptable and the previous measurement substituted therefor.

The new measurement signal is applied to an input means or memory circuit 55 and also to a subtractor circuit 60. The previous measurement stored in the averaging circuit 35, which may also be displayed in the display device 40, is also applied to the subtractor circuit 60 and also to memory 65; and the difference between these two numbers is applied to the comparator circuit 70, which compares this number to a deviation limit established by the circuit 75.

If the difference between the new and previous measurement is within the deviation limit, then an output on line 77 from the circuit 70 will cause the contents of the memory 55 to be transferred to the averaging circuit 35. On the other hand, if the difference between the new measurement and the previous measurement exceeds the deviation limit, then the circuit 70 provides an output on line 78 to cause the previous measurement value stored in memory 65 to be transferred to the averaging circuit 35.

The alarm circuit 45 may be connected to line 78 to provide an output whenever a predetermined number of new measurement signals which are outside the deviation limit occur within a predetermined number of measurement intervals.

Thus, if the new measurement signal is within the deviation limit, it will be transferred to the averaging circuit 35, but if the new measurement signal is outside the deviation limit, the previous measurement signal will be applied to the averaging circuit 35.

As illustrated in FIG. 3, the averaging circuit 35 and the display 40 are considered the output circuit means. As explained previously, the averaging circuit can be adjusted to store only the previous measurement signal or the average of a predetermined number of previous measurement signals applied thereto.

Figure 4:
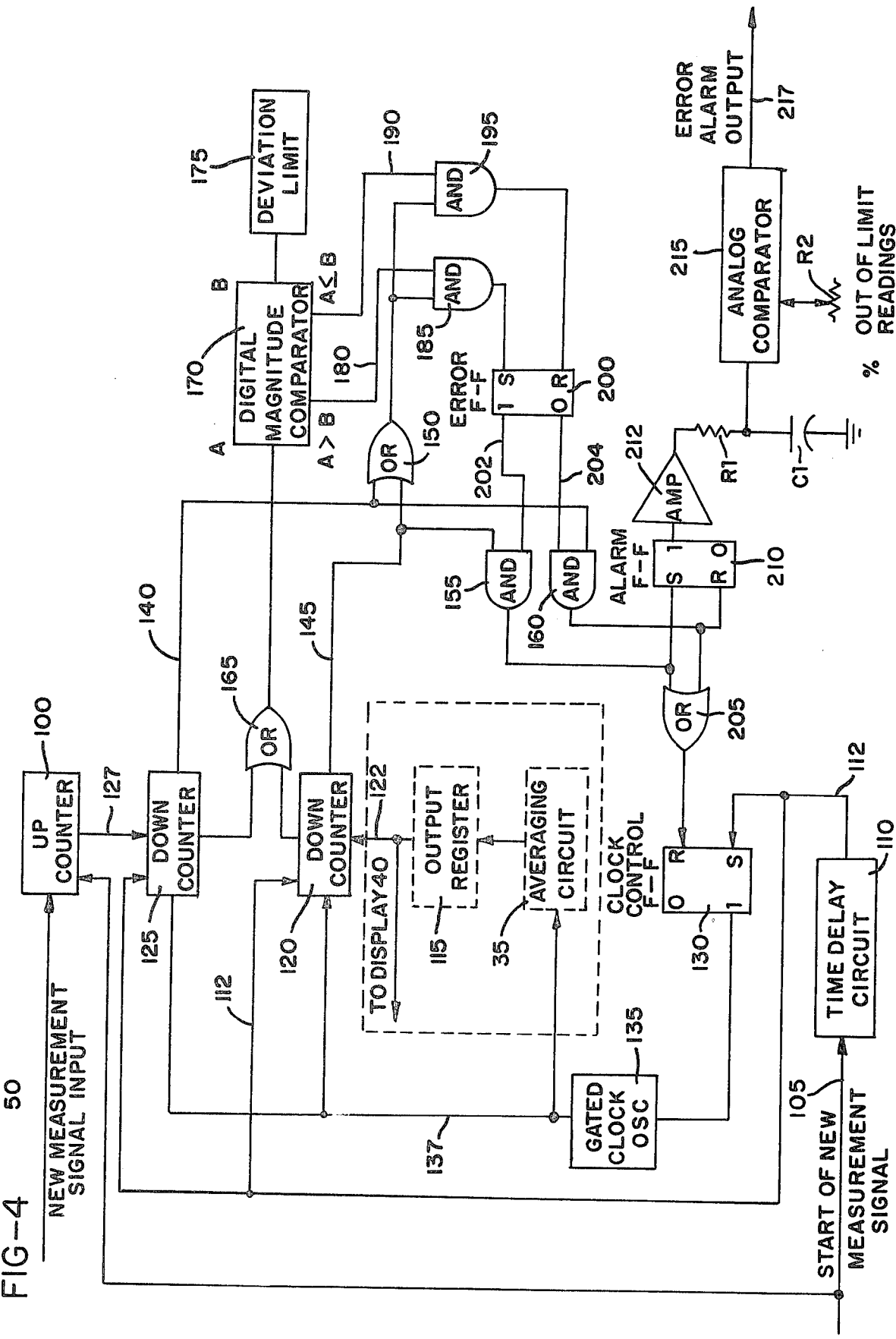
FIG. 4 is a block diagram showing another embodiment of the invention.

Referring now to the embodiment of the invention shown in the block diagram of FIG. 4, each new measurement signal in the form of a series of pulses, typically at a 47 MHz rate, representing the diameter of the object 20 will be applied on line 50 to an input circuit means including an up-counter 100. Preceding each new measurement interval, the optical micrometer generates a new measurement pulse on line 105 which is applied to reset the up-counter 105 and to initiate operation of time delay circuit 110. An output from time delay circuit 110 will appear on line 112 after a time delay sufficient to insure that the new diameter measurement has been completed, but not so long as to prevent the circuit of FIG. 4 completing its cycle of operation before a new diameter measurement is made.

The previous measurement signals are applied to averaging circuit 35, and stored in an output register 115, the output of which is connected to a display device 40 and to a down-counter 120 by a cable 122. Up-counter 100 is connected to a similar down-counter 125 by means of a cable 127.

At the end of the time delay established by the circuit 110, an output on line 112 is applied to down-counters 120 and 125 to cause these counters to be jam loaded with the numbers appearing in the output register 115 and up-counter 100, respectively; and simultaneously, the output on line 112 will set the clock control flip-flop 130, and this in turn causes the gated clock oscillator 135 to provide an output in the form of a series of pulses at a 2 MHz rate on line 137 to the averaging circuit 35, and down-counters 120 and 125.

The new measurement signal is therefore transferred to the down-counter 125 while the previous measurement signal is transferred to the down-counter 120, and the difference in the numbers of these two counters will be determined and compared to a deviation limit in the following manner.

When either down-counters 120 or 125 reaches its terminal or zero count, these counters will generate a signal indicating this fact on lines 140 or 145, and these signals are applied to OR gate 150 and AND gates 155 and 160.

The outputs of down-counters 120 and 125 are connected through an OR gate 165 to a digital magnitude comparator circuit 170. It should be understood that OR gate 165 is actually a plurality of OR gates, one gate for each stage of the counters, and therefore when one of the down-counters 120 or 125 reaches its terminal count, the binary number then existing in the other down-counter can be compared by the comparator circuit 170 to a number representing the deviation limit established by a deviation limit circuit 175. In the preferred embodiment of the invention, the digital magnitude device is a digital integrated circuit magnitude comparator using type 47L585 integrated circuits, and the deviation limit circuit 175 is preferably a set of switches which may be manipulated to create a binary number representing the deviation limit.

If the number applied to the comparator 170 is greater than the deviation limit, an output will appear on line 180 to AND gate 185; and if the number is equal to or less than the deviation limit, an output will appear on line 190 to AND gate 195.

Thus, the circuit just described establishes the difference between the new measurement and the previous measurement and compares that difference to a preset deviation limit. If the difference does not exceed the deviation limit, then the new measurement signal will be applied to the output. On the other hand, if the difference exceeds the deviation limit, the previous measurement signal will be applied to the output.

Assuming first that the differences between the numbers in the down-counters 120 and 125 exceeds the deviation limit, and assuming further that down-counter 125 reaches its terminal count before down-counter 120, then when an output appears on line 140, gate 150 will provide one input to AND gate 185 and line 180 will provide the other input and AND gate 185 will provide an output on line 202 to one input of AND gate 155; however, because down-counter 120 has not yet reached its terminal count, the other input to AND gate 155 is not then available, and the gated clock oscillator 135 will continue to operate and down count the counter 120 until it reaches its terminal count, at which time an output will appear on line 145 to AND gate 155 will satisfy its input conditions and an output then applied to OR gate 205 to reset the clock control flip-flop 120 and terminate the operation of the gated clock oscillator 135. Accordingly, down-counter 120 will have reached its terminal count by receiving a number of pulses equal to the number within the counter; and that same number of pulses will have been applied as an input to the averaging circuit 35. Thus, the averaging circuit will have been supplied with a number equal to the previous measurement signal as recorded in the output register 115.

Assuming again that the difference between the new measurement signal and the previous measurement signal exceeds the deviation limit, but that the down-counter 120 reached its terminal count first, it will be easily seen that the output on line 145 will simultaneously be applied through OR gate 150 to AND gate 185 and to the AND gate 155; and therefore the gated clock oscillator 130 will have its operation terminated immediately upon the down-counter 120 and the averaging circuit 35 receiving a number of pulses equal to the previous measurement.

If the difference between the new measurement signal and the previous measurement signal does not exceed the deviation limit, then at the time one of the down-counters 120 or 125 reaches its terminal count, an output on line 190 will be applied to one of the inputs of AND gate 195, and simultaneously the other input will be received through OR gate 150, and the output of AND gate 195 will be applied to reset error flip-flop 200, and its output on line 204 will be applied as one input to AND gate 160. Assuming first that down-counter 125 (which stores the new measurement), reaches its terminal state first, then the other input of AND gate 160 will be provided on line 140, and the clock control flip-flop 130 will be gated off through OR gate 205. If, however, the down-counter 120 (which stores the previous measurement) reaches its terminal state first, error flip-flop 200 will be reset to provide one input to AND gate 160, but the other input on line 140 will be delayed until down-counter 125 reaches its terminal state. Thus, under these conditions, the number of pulses supplied to the averaging circuit 35 will be equal to the number stored in down-conter 125, and the output therefor will be provided with a number equal to the new measurement value.

An out-of-limit measurement signal from the AND gate 155 will cause the alarm flip-flop 210 to set, while an in-limits measurement signal from gate 160 will cause an alarm flip-flop 210 to reset. When the alarm flip-flop 210 is set, an output will be applied through amplifier 212 to an R-C circuit causing capacitor C1 to charge at a rate determined by variable resistor R1.

The voltage developed across capacitor C1 is compared to a reference voltage obtained from potentiometer R2 by an analogue comparator circuit 215, and if a sufficient number of out-of-limits new measurement signals within a given time period, the voltage on C1 will rise to a value sufficient to cause the analogue comparator 215 to provide an error alarm output on line 217 to the alarm circuit 45.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. In an optical micrometer for measuring a dimension of an article within a zone of measurement, said optical micrometer generating input data in the form of pulses during each measurement interval representing the dimension of the article,
   the improvement comprising
   first counter means for receiving said input data during each measurement interval,
   means for generating a command pulse following each measurement interval,
   second counter means responsive to said command pulse for receiving the input data from said first counter means,
   output register means for storing the data from the previous measurement interval,
   third counter means responsive to said command pulse for receiving the input data from the previous measurement interval,
   clock means for supplying pulses to said output register means and to said second and third counter means following said command pulse for causing said counter means to decrement, said counter means each providing a zero output signal upon reaching a zero count,
   gate means for transferring the remaining data from the other of said second or third counter means to a comparison circuit when one of said second or third counter means reaches zero,
   said comparison circuit comparing the number remaining in said other counter means with a preset, adjustable number,
   circuit means responsive to the output of said comparison circuit for controlling the operation of said clock means for
   a. terminating said clock means when said second counter means reaches zero, provided said deviaition limit is not exceeded, and
   b. terminating the operation of said clock means when said third counter means reaches zero, provided said deviation limit is exceeded,
   whereby said output register means contains either new input data, if within predetermined limits, or previous input data.

2. The apparatus of claim 1 wherein said previous input data is the average of a predetermined number of preceding output signals.

3. The apparatus of claim 1 wherein said previous input data is the preceding output signal.

4. The apparatus of claim 1 further including alarm means for providing an output whenever a predetermined number of new input data which are outside the deviation limit occur within a predetermined number of measurement intervals.

5. An optical micrometer for measuring the dimension of an article placed within a zone of measurement including
  means for periodically scanning a beam of light through said zone of measurement,
  means sensing the light passing through the zone of measurement and for generating a measurement signal including electrical pulses representing the dimension of the article within the zone of measurement during each measurement interval,
  input means for receiving said pulses during each measurement interval,
  output circuit means for storing a previous measurement signal,
  means for comparing each new measurement signal with said previous measurement signal,
  reference means for establishing a limit of deviation for each new measurement signal from the previous measurement signal and for providing a first output signal whenever the limit of deviation is exceeded and for providing a second output signal whenever the limit of deviation is not exceeded,
  means for transferring to said output circuit means said previous measurement signal in response to said first output signal, and
  means for transferring to said output circuit means said new measurement signal in response to said second output signal.

6. The optical micrometer of claim 5 wherein said previous measurement signal is the average of a predetermined number of preceding output signals.

7. An optical micrometer for measuring the dimension of an article placed within a zone of measurement including
  means for periodically scanning a beam of light through said zone of measurement,
  means for sensing the light passing through said zone of measurement and for generating electrical pulses representing the dimension of the article during each measurement interval,
  up-counter means for receiving said electrical pulses dureing each measurement interval,
  first down-counter means,
  means for transferring a previous measurement signal to said first down-counter means,
  second down-counter means,
  means for transferring a previous measurement signal to said second down-counter means,
  clock means for providing pulses to decrement both said first and second down-counter means until one reaches its terminal state,
  means for comparing the number in the remaining down-counter means to a preset deviation limit,
  output means, and
  means for transferring the new measurement to said output means whenever the deviation is within said deviation limit and for transferring the previous measurement to the output means whenever said deviation limit is exceeded.

* * * * *